United States Patent
Kuroda

(10) Patent No.: US 6,230,126 B1
(45) Date of Patent: May 8, 2001

(54) WORD-SPOTTING SPEECH RECOGNITION DEVICE AND SYSTEM

(75) Inventor: Masaru Kuroda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/213,248

(22) Filed: Dec. 17, 1998

(30) Foreign Application Priority Data

Dec. 18, 1997 (JP) .................................................. 9-364638

(51) Int. Cl.[7] ........................... G10L 15/02; G10L 15/00; G10L 15/12
(52) U.S. Cl. ......................... 704/231; 704/2.51; 704/252; 704/236
(58) Field of Search ..................................... 704/243, 245, 704/239, 236, 237, 231, 251, 252

(56) References Cited

U.S. PATENT DOCUMENTS

| | | | | |
|---|---|---|---|---|
| 4,513,436 | * | 4/1985 | Nose et al. ............................. | 704/243 |
| 5,159,637 | * | 10/1992 | Okazaki et al. ....................... | 704/238 |
| 5,794,194 | * | 8/1998 | Takebayashi et al. ................ | 704/251 |
| 5,893,058 | * | 4/1999 | Kosaka .................................. | 704/236 |

OTHER PUBLICATIONS

Komori et al, ("A New Learning Algorithm for Minimizing Spotting Errors,"0 Neural Networks for Processing, IEEE Signal Processing Workshop, Sep. 1993).*

Takebayashi, et al, ("A Robust Speech Recognition System using Word–Spotting with Noise Immunity Learning," Conference on Acoustics, Speech and Signal Processing, ICASSP–91, Apr. 1991).*

Huang, et al, ("On Speaker–Independent, –Dependent and —Adaptive Speech Recognition," IEEE Transactions on Speech and Audio Processing, Apr. 1993).*

Tetsuya Muroi, et al., "Isolated Spoken Word Recognition By Duration Based State Transition Models", Journal of the Institute of Electronics, Information and Communication Engineers, vol. J72–D–II, Nov. 1989, pp. 1769–1777.

* cited by examiner

*Primary Examiner*—Richemond Dorvil
*Assistant Examiner*—Daniel A. Nolan
(74) *Attorney, Agent, or Firm*—Oblon, Spivak, McClelland, Maier & Neustadt, P.C.

(57) ABSTRACT

A device for speech recognition includes a dictionary which stores features of recognition objects. The device further includes a matching unit which compares features of input speech with the features of the recognition objects, and a dictionary updating unit which updates time lengths of phonemics in the dictionary based on the input speech when the matching unit finds substantial similarities between the input speech and one of the recognition objects.

15 Claims, 8 Drawing Sheets

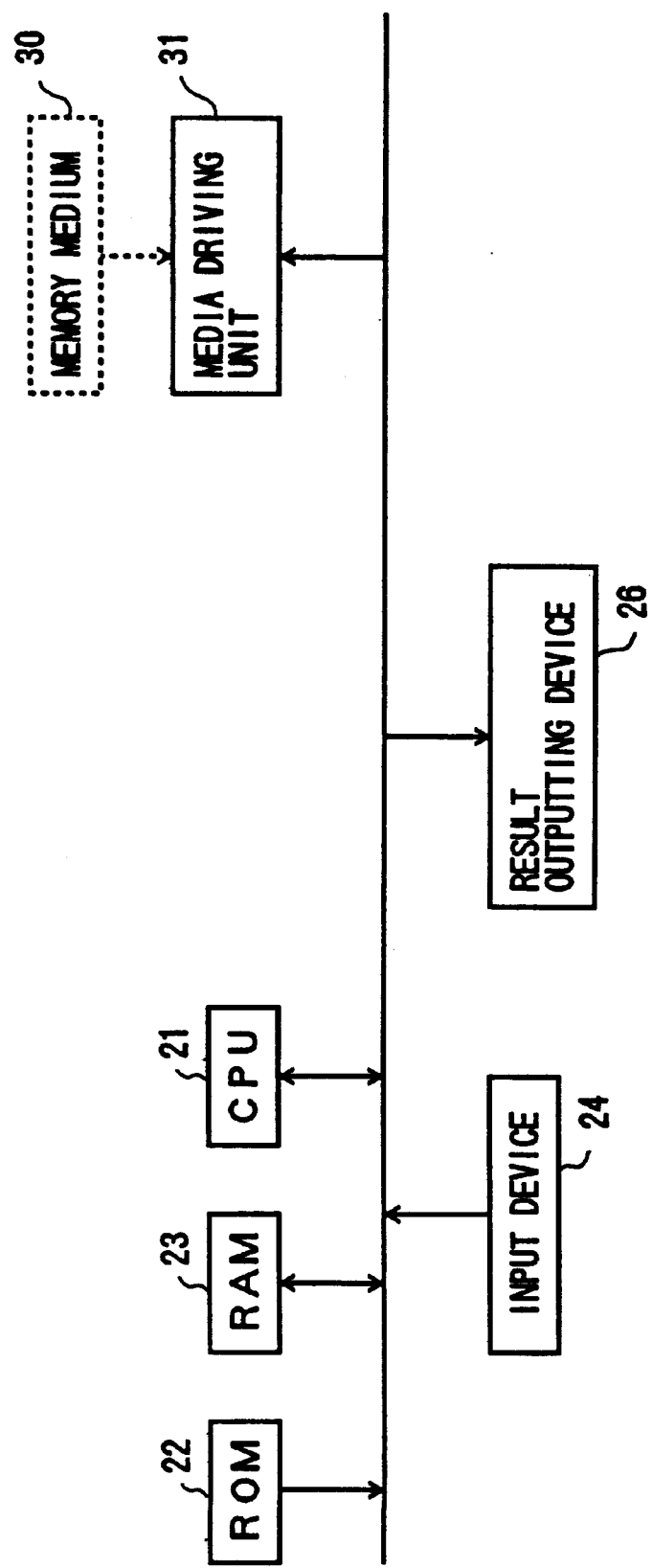

WORD-SPOTTING SPEECH RECOGNITION DEVICE AND SYSTEM

BACKGROUND OF THE INVENTION

1. Field of the Invention

The present invention relates to a speech-recognition device.

2. Description of the Related Art

One of the well-known methods of speech recognition is to attend to speech recognition based on speech-frame detection. This scheme determines a start and an end of a speech frame to be recognized by using power information of the speech or the like, and performs a recognition process based on information obtained from the speech frame.

FIG. 1 is a flowchart of a method of recognizing speech based on speech-frame detection. In the speech recognition based on the speech-frame detection, a recognition process is started (step S1), and speech frames are detected as a speaker produces a speech (step S2). Speech information obtained from a speech frame is matched against a dictionary pattern (step S3), and a recognition object (a word in the dictionary) is output as a recognition result when this object exhibits the highest similarity (step S4). At the step S2, a beginning of a speech frame can be easily detected based on power information. An end of a speech frame, however, is detected when a silence continues to be present for more than a predetermined time period. This measure is taken in order to insure that a silence before a plosive consonant and a silence of a double consonant are differentiated.

A period of silence for detecting an end of a speech frame, however, is generally as long as about 250 msec to 350 msec because of a need to differentiate a silence of a double consonant. In this scheme, therefore, a recognition result is not available until the end of the time period of 250 msec to 350 msec after a completion of speech input. This makes a recognition system which is slow in response. If the period of silence for detecting the end of a speech frame is shortened for the sake of faster response, an erroneous recognition result may be obtained because the result of a double consonant comes out before the end of a speech.

It is often observed that a speaker makes redundant sounds irrelevant to recognition of speech as in a situation where he/she may say "ah", "oh", etc. Since matching with a dictionary is started at a beginning of a speech frame when the speech frame is subjected to a recognition process, such redundant voices as "ah" and "oh" hinder detection of similarities, and result in an erroneous recognition result.

A word spotting scheme is designed to counter various drawbacks described above. FIG. 2 is a flowchart of a process of a word spotting scheme. In this scheme, a recognition process is started (step S11), and speech information is matched against a dictionary without detecting a speech frame as a speaker makes a speech (step S12). Then, a check is made as to whether a detected similarity measure exceeds a predetermined threshold value (step S13). If it does not, a procedure goes back to the step S12 to continue matching of speech information against the dictionary. If the similarity measure exceeds the threshold at the step S13, a recognition object corresponding to this similarity measure is output as a recognition result (step S14). The word spotting scheme does not require detection of a speech frame, so that it facilitates implementation of a system having a faster response. Also, the word spotting scheme takes redundant words away from a speech before outputting recognition results, thereby providing a better recognition result.

The word spotting scheme has its own drawback as described in the following. In the word spotting scheme, no speech frame is detected, and matching against a dictionary is conducted consecutively. If a result of the matching exceeds a threshold, a recognition result is obtained. Otherwise, the matching process is continued. Since the matching process is kept running regardless of the speaker's action, the recognition result obtained from this process may be output even when the speaker is not voicing a word to be recognized. This is called fountaining. For example, fountaining is observed when the speaker is not talking to the recognition device but is talking with someone around him/her.

A method of implementing the word spotting scheme can be found, for example, in "Method of Recognizing Word Speech Using a State Transition Model of Continuous Time Control Type", Journal of the Institute of Electronics, Information and Communication Engineers, vol. J72-D-II, No.11, pp.1769–1777 (1989). According to the method disclosed in this document, data indicative of a time length is attached to phonemics in a dictionary or codebook. As a result, an improved recognition performance is obtained while reducing the amount of computation. In this method, however, a dictionary of recognized words is compiled by connecting phonemics using an average time length of each phonemic. Because of this, a long word in the dictionary may not correspond to an actually spoken word in terms of the time length of the word. This is because there is a psychological tendency that a speaker tries to speak a shorter word and a longer word in an equal time length. Further, when the speaker is excited, speech may become faster, and voice may be raised. In such situations, a speech-recognition device may experience a degradation in matched similarity measures, and may suffer a drop in a recognition performance. If the speech-recognition device uses the time length as a parameter, a speed of making a speech for a given speaker may be far different from a time length stored in a standard dictionary.

In this manner, the related-art voice-recognition device compiles words of a dictionary by connecting phonemics using an average time length of each phonemic. Because of this, there may be a discrepancy in a time length between a word in the dictionary and an actually spoken word, resulting in a degradation in recognition performance.

Accordingly, there is a need for a speech-recognition device which can enhance a recognition performance by updating time-length parameters in a standard dictionary in accordance with a time length of an actually spoken word.

SUMMARY OF THE INVENTION

Accordingly, it is a general object of the present invention to provide a speech-recognition device which can satisfy the need described above.

It is another and more specific object of the present invention to provide a speech-recognition device which can enhance a recognition performance by updating time-length parameters in a standard dictionary in accordance with a time length of an actually spoken word.

In order to achieve the above objects according to the present invention, a device for speech recognition includes a dictionary which stores features of recognition objects, a matching unit which compares features of input speech with the features of the recognition objects, and a dictionary updating unit which updates time lengths of phonemics in the dictionary based on the input speech when the matching unit finds substantial similarities between the input speech and one of the recognition objects.

According to another aspect of the present invention, the device as described above further includes a feature-extraction unit which extracts the features of input speech from the input speech without detecting speech frames, and wherein the matching unit compares the features of input speech with the features of the recognition objects so as to produce a similarity measure continuously without breaks of speech frames, and the dictionary updating unit updates the time lengths of phonemics when the similarity measure exceeds a predetermined threshold.

According to another aspect of the present invention, the device as described above is such that the dictionary updating unit compares a sum of the time lengths of phonemics constituting the one of the recognition objects with an actual time length of the input speech corresponding to the one of the recognition objects, and updates the time lengths of the phonemics in the dictionary based on a difference between the sum and the actual time length.

According to another aspect of the present invention, the device as described above is such that the dictionary updating unit obtains a difference between a time length of a phonemic in the dictionary and a time length of the same phonemic in the input speech, and adds the difference to the time length of the phonemic in the dictionary so as to update the time lengths of phonemics in the dictionary.

According to another aspect of the present invention, the device as described above is such that the dictionary updating unit obtains a difference between a time length of a phonemic in the dictionary and a time length of the same phonemic in the input speech, and adds the difference multiplied by a given weighting factor to the time length of the phonemic in the dictionary so as to update the time lengths of phonemics in the dictionary.

According to another aspect of the present invention, the device as described above is such that the weighting factor varies depending on how great the substantial similarities are.

According to another aspect of the present invention, the device as described above is such that the weighting factor varies depending on how many times the matching unit correctly finds the substantial similarities with respect to the one of the recognition objects.

According to another aspect of the present invention, the device as described above is such that the dictionary updating unit updates a time length of a given phonemic in the dictionary not only with respect to the one of the recognition objects but also with respect to all the recognition objects that include the given phonemic.

The objects presented earlier can also be achieved by a method of conducting speech recognition. The method includes the steps of a) storing features of recognition objects in a dictionary, b) comparing features of input speech with the features of the recognition objects, and c) updating time lengths of phonemics in the dictionary based on the input speech when the step b) finds substantial similarities between the input speech and one of the recognition objects.

According to another aspect of the present invention, the method as described above further includes a step of extracting the features of input speech from the input speech without detecting speech frames, and wherein the step b) compares the features of input speech with the features of the recognition objects so as to produce a similarity measure continuously without breaks of speech frames, and the step c) updates the time lengths of phonemics when the similarity measure exceeds a predetermined threshold.

According to another aspect of the present invention, the method as described above is such that the step c) compares a sum of the time lengths of phonemics constituting the one of the recognition objects with an actual time length of the input speech corresponding to the one of the recognition objects, and updates the time lengths of the phonemics in the dictionary based on a difference between the sum and the actual time length.

The objects presented earlier can also be achieved by a machine-readable memory medium having a program embodied therein for causing a computer to perform a speech recognition. The program includes a dictionary configured to store features of recognition objects, a matching unit configured to compare features of input speech with the features of the recognition objects, and a dictionary updating unit configured to update time lengths of phonemics in the dictionary based on the input speech when the matching unit finds substantial similarities between the input speech and one of the recognition objects.

According to another aspect of the present invention, the machine-readable memory medium as described above is such that the program further comprises a feature-extraction unit configured to extract the features of input speech from the input speech without detecting speech frames, and wherein the matching unit compares the features of input speech with the features of the recognition objects so as to produce a similarity measure continuously without breaks of speech frames, and the dictionary updating unit updates the time lengths of phonemics when the similarity measure exceeds a predetermined threshold.

According to another aspect of the present invention, the machine-readable memory medium as described above is such that the dictionary updating unit compares a sum of the time lengths of phonemics constituting the one of the recognition objects with an actual time length of the input speech corresponding to the one of the recognition objects, and updates the time lengths of the phonemics in the dictionary based on a difference between the sum and the actual time length.

Other objects and further features of the present invention will be apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a block diagram showing a hardware configuration of the speech-recognition device shown in FIG. 3.

DESCRIPTION OF THE PREFERRED EMBODIMENTS

In the following, embodiments of the present invention will be described with reference to the accompanying drawings.

Figure 1:
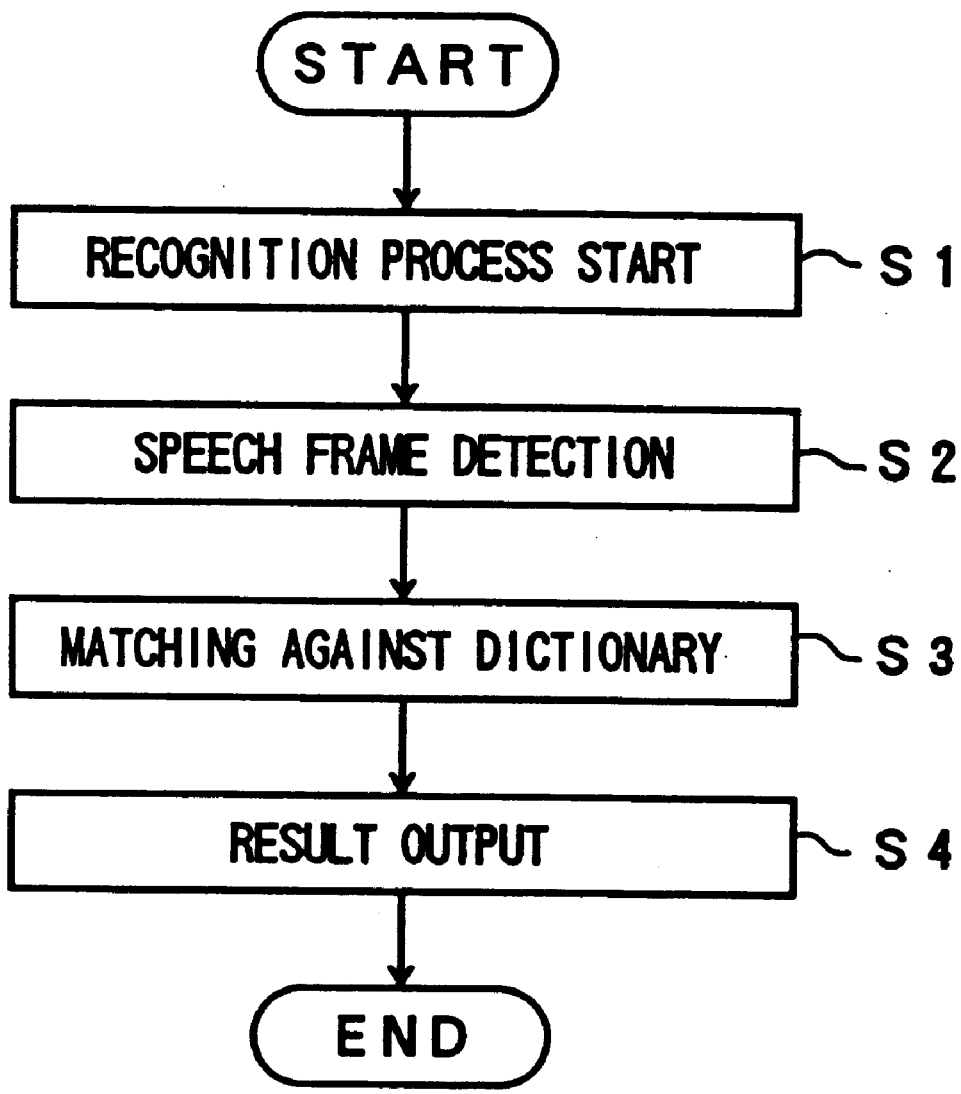
FIG. 1 is a flowchart of a method of recognizing speech based on speech-frame detection.
Figure 2:
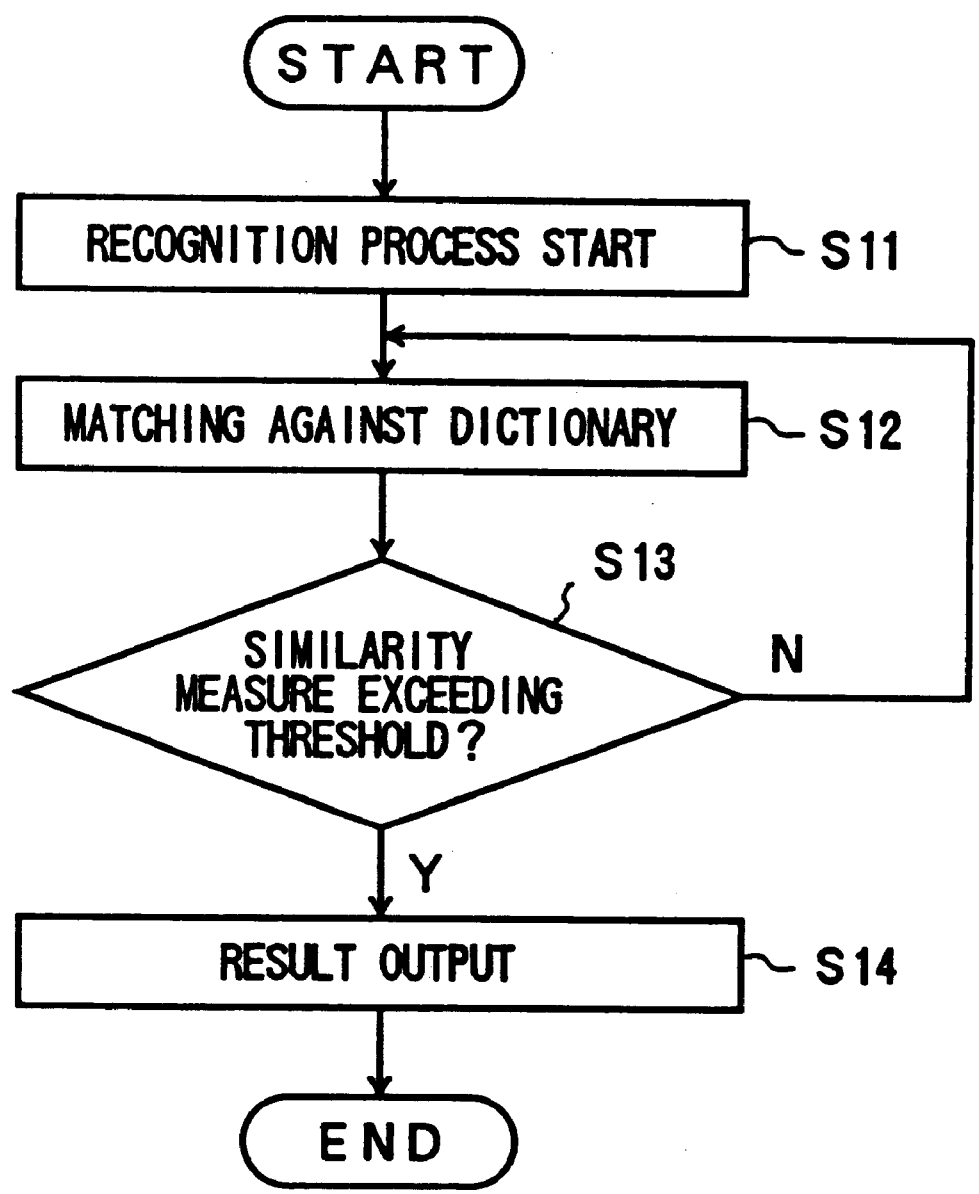
FIG. 2 is a flowchart of a process of a word spotting scheme.
Figure 3:
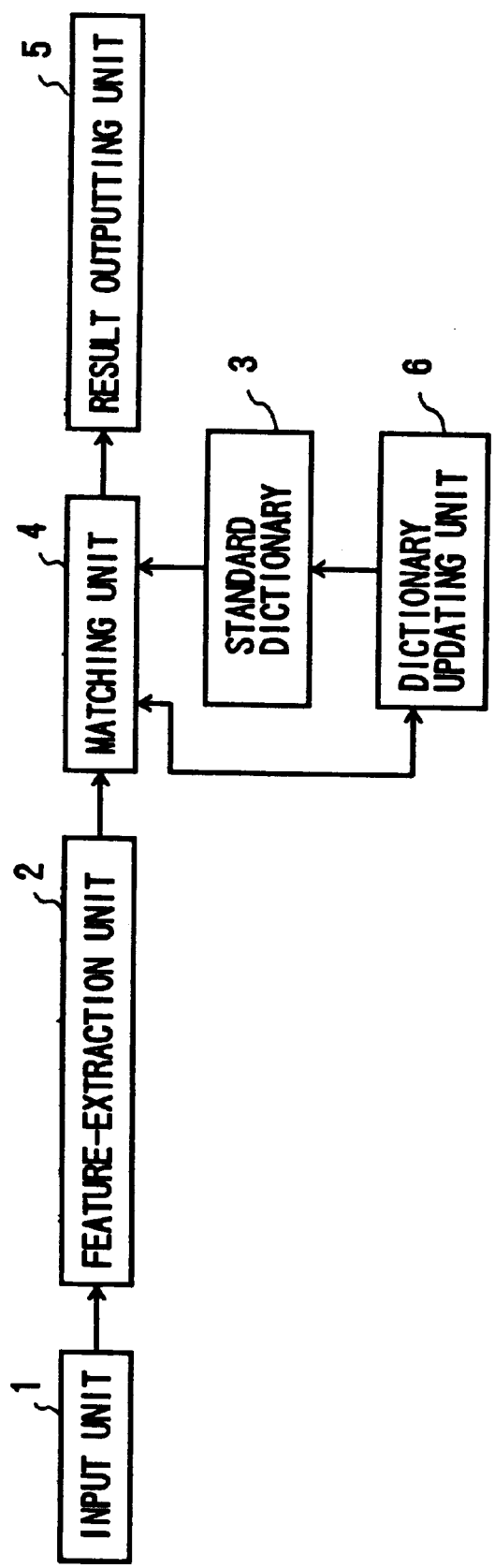
FIG. 3 is a block diagram of a speech-recognition device according to the present invention.

FIG. 3 is a block diagram of a speech-recognition device according to the present invention. In FIG. 3, the speech-recognition device includes an input unit (e.g., microphone) 1, a feature-extraction unit 2, a standard dictionary 3, a matching unit 4, a result outputting unit 5, and a dictionary updating unit 6. The input unit 1 is used for inputting speech. The feature-extraction unit 2 extracts features from the speech input via the input unit 1. The standard dictionary 3 stores standard features of all the recognition objects. The matching unit 4 matches the features of the input speech with the standard features of the recognition objects stored in the standard dictionary 3 when the features of the input speech are extracted by the feature-extraction unit 2, thereby obtaining a similarity measure with respect to each recognition object. Based on the matching results, the result outputting unit 5 outputs a recognition object as a recognition result when this recognition object has the highest similarity measure that exceeds a predetermined threshold value (i.e., a rejecting threshold value), for example. The dictionary updating unit 6 updates the standard dictionary 3.

The feature-extraction unit 2, the standard dictionary 3, the matching unit 4, and the result outputting unit 5 employ a recognition process based on the word spotting scheme, for example, which does not need detection of speech frames. As a recognition process based on the word spotting scheme, a word-speech-recognition scheme using a state-transition model of a consecutive-time-control type may be employed. When this word-speech-recognition scheme is used, a detected similarity measure becomes a maximum near an end of a speech, and a detection of a peak of the similarity measure leads to outputting of a recognition result.

In what follows, a description will be given with regard to operations of the speech-recognition device of FIG. 3.

When speech is input to the input unit 1, the input speech is converted into a predetermined set of features by the feature-extraction unit 2. The features which can be used in the present invention include TSP indicative of power in a frequency domain and cepstrum.

The features of the input speech obtained by the feature-extracting unit 2 are then compared with the standard features of each recognition object stored in the standard dictionary 3. This comparison is made by the matching unit 4, and a similarity measure is obtained with respect to each recognition object. Based on the matching results of the matching unit 4, the result outputting unit 5 outputs a recognition object as a recognition result when this recognition object has the highest similarity measure that exceeds a predetermined threshold value (i.e., a rejecting threshold value), for example.

The standard dictionary 3 stores a representation of a state corresponding to each phonemic to be recognized. In order to represent this state, a feature vector Yj and a time length Lj are used as parameters. Here, the time length Lj is an average time length defined for each phonemic.

Figure 4:
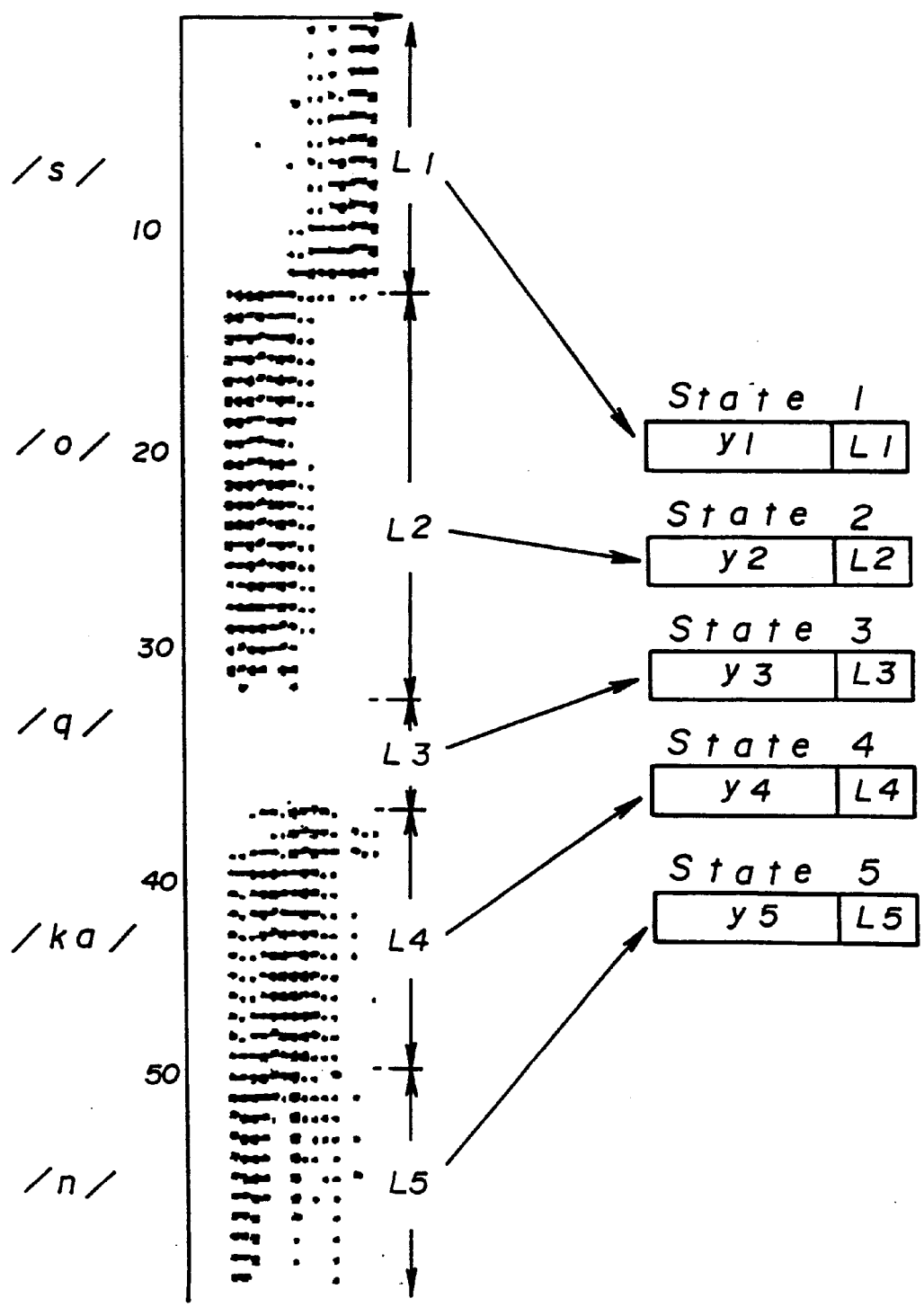
FIG. 4 is an illustrative drawing showing an example of parameters stored in a dictionary.

Take an example of a Japanese word "soqkan" (meaning "correlation"). Each phonemic of this word, i.e., /s/, /o/, /q/, /ka/, and /n/, has a corresponding state thereof, and five states in total (State 1 through State 5) are represented as shown in FIG. 4. Each state representing features of a corresponding phonemic is defined by a pair of a feature vector Yj (j=1 to 5) and a time length Lj (j=1 to 5). A total time length of this word is represented as a sum of Lj. That is, the total time length is represented by a sum of the time lengths Lj added together with respect to all the phonemics included in the word.

$$Ltot = \sum_j Lj$$

As previously described, however, a time length of an actually spoken word may not be equal to the sum Ltot of the time lengths of all the phonemics in the word calculated based on the standard dictionary.

In order to obviate this problem, the speech-recognition device of FIG. 3 is provided with the dictionary updating unit 6 for updating the standard dictionary 3. The dictionary updating unit 6 updates the standard dictionary as it becomes necessary in accordance with fluctuation of the speaker's speech (i.e., fluctuation in speech speed).

In detail, the dictionary updating unit 6 compares a time length of an actually spoken word with a sum of time lengths of all the phonemics included in a recognition object in the standard dictionary 3 when the recognition object has a similarity measure exceeding the threshold value according to the matching by the matching unit 4. This is performed where a time length of each phonemic is provided in the standard dictionary 3. Based on the comparison, the dictionary updating unit 6 updates a time length of a phonemic in the standard dictionary 3 with respect to all the phonemics included in the recognition object.

Figure 5:
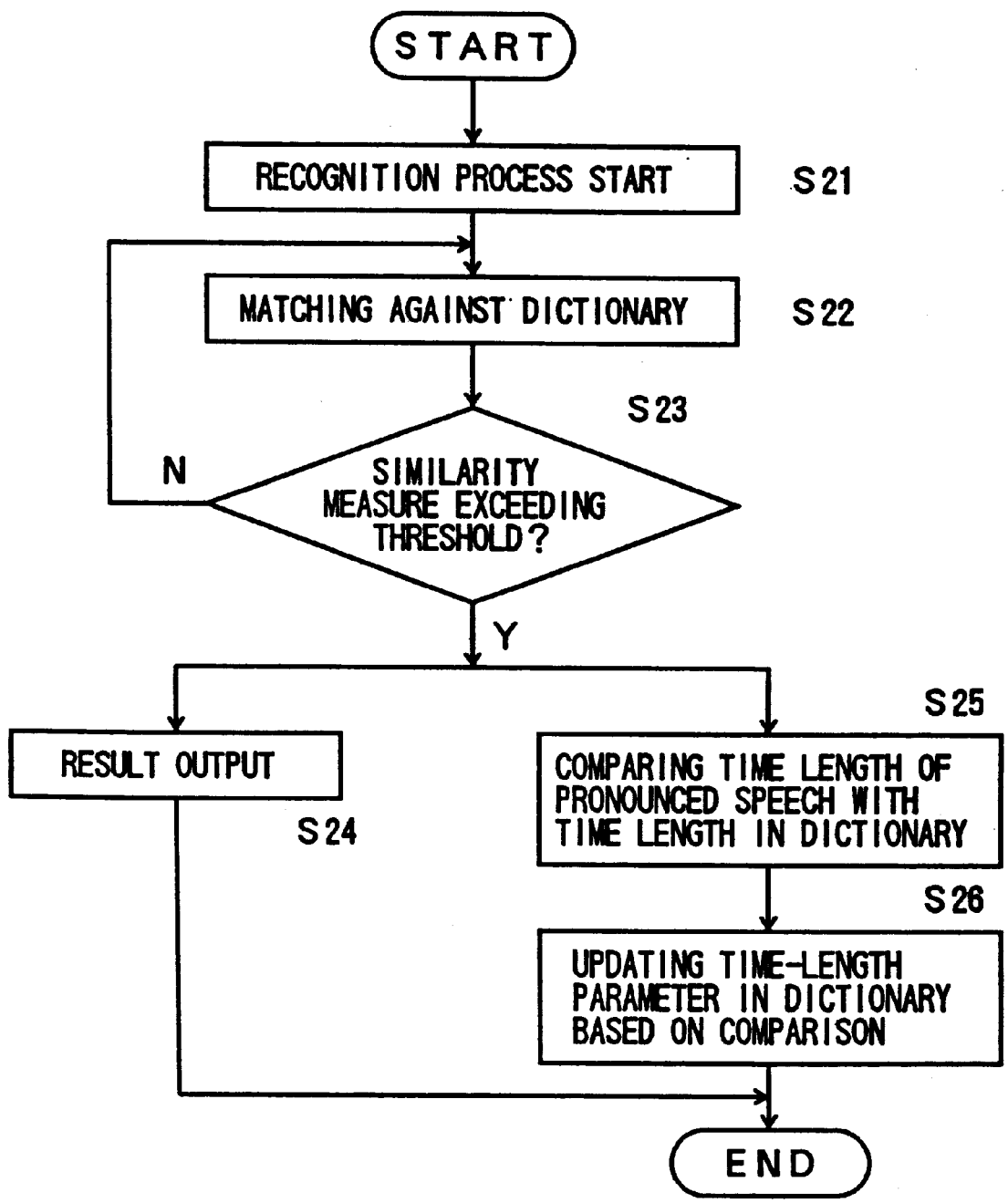
FIG. 5 is a flowchart for explaining operations of the speech-recognition device of FIG. 3.

FIG. 5 is a flowchart for explaining operations of the speech-recognition device of FIG. 3. As shown in FIG. 5, a recognition process is started (step S21), and speech information is matched against the dictionary 3 without detecting a speech frame as a speaker makes a speech (step S22). Then, a check is made as to whether a detected similarity measure exceeds a predetermined threshold value (step S23). If it does not, a procedure goes back to the step S22 to continue matching of speech information against the dictionary 3. If the similarity measure exceeds the threshold at the step S23, a recognition object corresponding to this similarity measure is output as a recognition result (step S24). The outputting of the recognition result is carried out after detecting a peak of the similarity measure following a moment at which the similarity measure exceeds a threshold value SMth.

When the similarity measure exceeds the threshold value, a comparison is made between a time length of a word obtained as the recognition result and a time length of an actually spoken word (step S25). Here, the time length of the word obtained as the recognition result is a sum of time lengths of all the phonemics included in the word in the standard dictionary 3. Based on the comparison (i.e., based on a difference between the two lengths), the time-length parameters Lj regarding phonemics stored in the standard dictionary 3 are modified (step S26). Namely, a difference between the time length of the word obtained as the recognition result and the time length of the actually spoken word is introduced to the time-length parameters Lj of the phonemics stored in the standard dictionary 3.

When there is a difference dt between a time-length parameter Lj of a given phonemic and an actually spoken time length of this phonemic, the difference dt may be directly introduced to the time-length parameter Lj such that Lj=Lj+dt. This is one way to modify the time-length parameters Lj stored in the standard dictionary 3. Alternatively, the difference dt between the time length Lj and the actually spoken time length may be multiplied by a coefficient (adjusting value) K, so that Kdt is used for modifying the time length of the phonemic. Namely, the time-length parameter Lj in the standard dictionary 3 may be modified for a given phonemic such that Lj=Lj+Kdt.

In summary, the dictionary updating unit 6 may update a time-length parameter Lj of a given phonemic included in the recognition object (word) in the standard dictionary by using a product of the time difference and a predetermined adjusting value.

Further, the dictionary updating unit 6 may modify a time length of a given phonemic in the standard dictionary even when the same phonemic of a different recognition object is subjected to the updating process.

Figure 6:
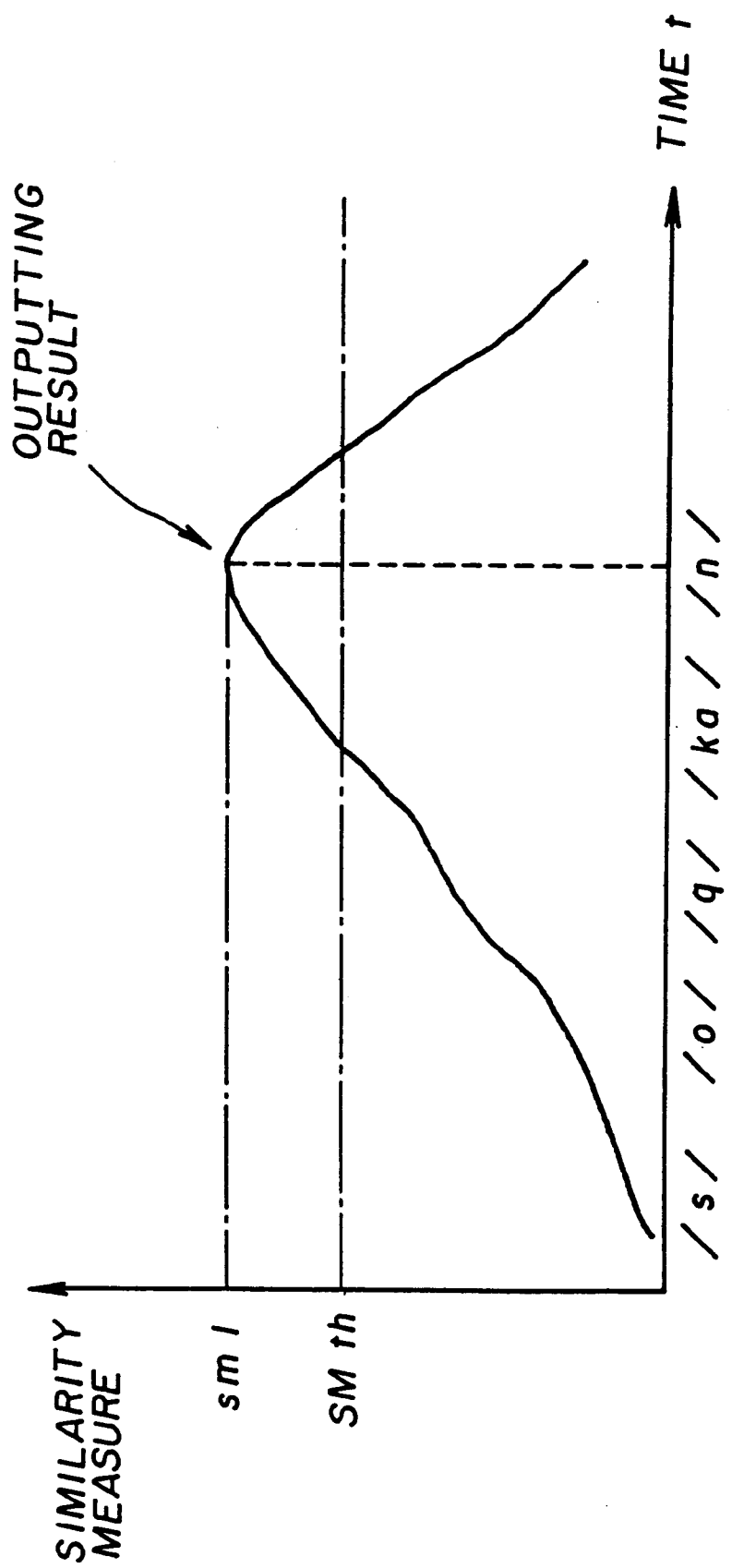
FIG. 6 is a chart showing a similarity measure obtained when a speaker pronounces a Japanese word "sokan"
Figure 7:
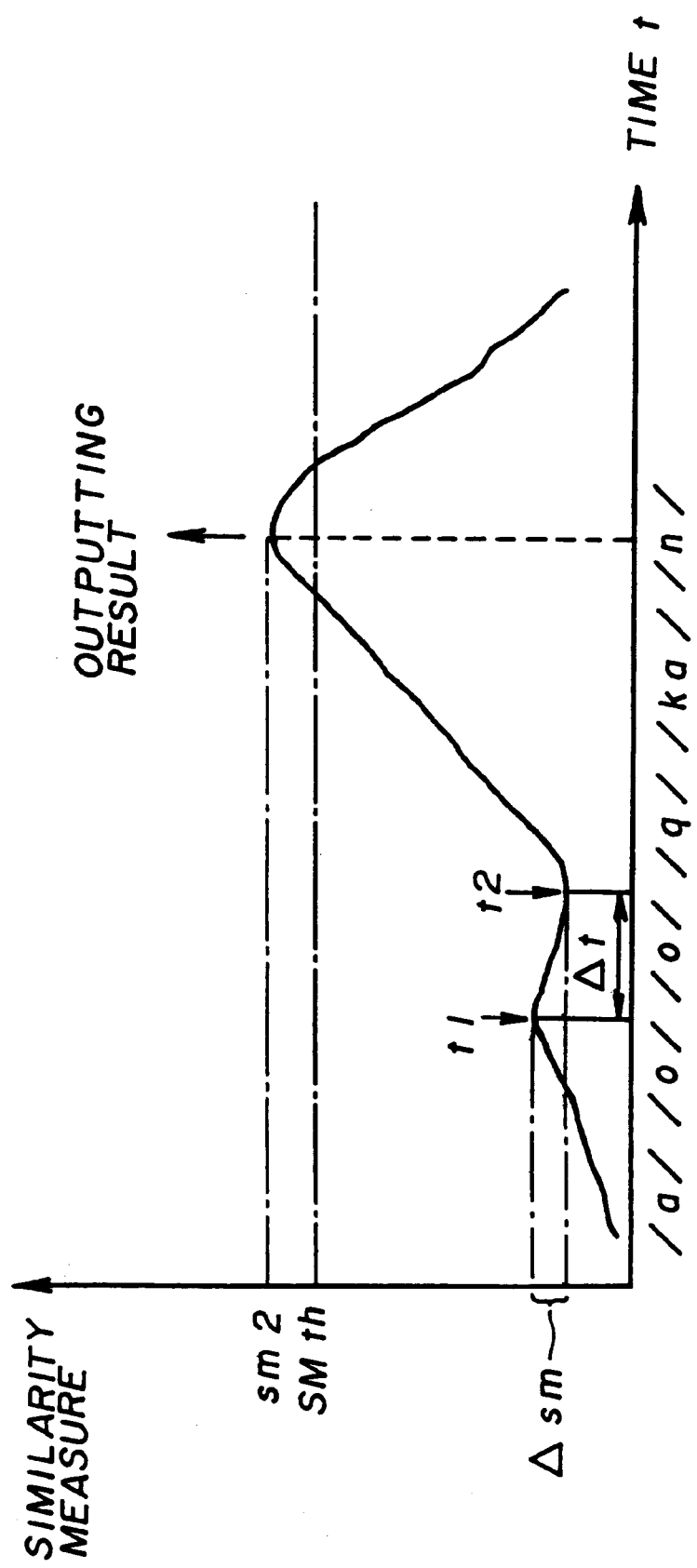
FIG. 7 is another chart showing a similarity measure obtained when a speaker pronounces the Japanese word "sokan"

In what follows, the present invention will be described by using a specific example. FIG. 6 is a chart showing a similarity measure obtained when a speaker pronounces the Japanese word "sokan". This word is represented as "/s/, /o/, /q/, /ka/, /n/" (/q/ indicates a period of silence). FIG. 7 is another chart showing a similarity measure obtained when a speaker pronounces the Japanese word "sokan".

FIG. 6 shows a case in which no difference is found between a time length of an actually spoken word and a sum of time lengths Lj (j=1 to 5) of all the phonemics included in the word in the standard dictionary 3. In this case, the similarity measure is gradually built up, and exceeds the threshold value SMth before reaching a level sm1 as shown in the figure.

FIG. 7, on the other hand, demonstrates a case in which a pronunciation of the word "sokan" has a spoken time length of /o/ thereof longer than a time length of a phonemic /o/ stored in the standard dictionary 3. At a time t1 in FIG. 7, a time period corresponding to a time length L2 of the phonemic /o/ in the standard dictionary 3 overlaps a time period of the actually spoken phonemic /o/. In an example shown in FIG. 7, however, the actually spoken phonemic /o/ further extends after the time t1, so that the time length of the actually pronounced phonemic /o/ differs from the time length L2 of the phonemic /o/ in the standard dictionary 3. Because of this, the similarity measure decreases toward a time t2. After the time t2, however, subsequent phonemics /q/, /ka/, and /n/ serve to increase the similarity measure. The similarity measure finally reaches a level sm2 after exceeding the threshold value SMth. The level sm2 is lower than the level sm1, which is expected to be reached in an ideal situation. The difference between the level sm2 and the level sm1 is equal to 2×dsm. Despite the attained level lower than expected, the similarity measure is still larger than the threshold value SMth, so that a recognition result is output in the case of FIG. 7. Here, the outputting of the recognition result is carried out after detecting a peak of the similarity measure following a moment at which the similarity measure exceeds a threshold value SMth.

In the case of FIG. 7, the actually pronounced length of the phonemic /o/ is longer than the time length of the phonemic /o/ in the standard dictionary 3 by a time difference dt, so that the time-length parameter L2 of the phonemic /o/ in the word "sokan" stored in the standard dictionary 3 is modified (updated) accordingly. Updating of the parameter L2 in the dictionary 3 may be conducted concurrently with the outputting of the recognition result. In the updating process, the time-length parameter L2 has the time difference dt added thereto, so that a new time-length parameter L2' is obtained. This is represented as:

$$L2'=L2+dt$$

Alternatively, the time difference dt may be multiplied by the predetermined adjusting value K in order to obtain the new time-length parameter L2' as shown in the following.

$$L2'=L2+K \cdot dt$$

Here, K may have a value ranging from about 0.1 to about 0.7, and may vary adaptively depending on how many times a correct recognition result is obtained with respect to a given recognition object as well as how great the similarity measure is.

In this manner, the present invention compares an average time length of an actual pronunciation with a time length obtained from the dictionary in accordance with the result of speech recognition, and dynamically modifies time-length parameters of the dictionary so as to enhance performance.

The time-length parameters stored in the standard dictionary 3 have a one-to-one correspondence with phonemics. That is, a time-length parameter is provided in the standard dictionary with respect to each phonemic. Accordingly, when a time-length parameter is updated in the standard dictionary 3 with respect to a given phonemic in a given recognition object (recognized word), the same phonemic in other recognition objects (other words) stored in the standard dictionary 3 can have a time-length parameter thereof also updated. For example, the word "koshin" is stored in the dictionary, and includes the phonemic /o/ as does the word "sokan". When the time-length parameter of the phonemic /o/ is updated in the word "sokan", the time-length parameter of the phonemic /o/ in the word "koshin" may also be changed at the same time so as to provide a new time-length parameter.

FIG. 8 is a block diagram showing a hardware configuration of the speech-recognition device shown in FIG. 3. As shown in FIG. 8, the speech-recognition device may be implemented by using a personal computer or the like, and includes a CPU 21, a ROM 22, a RAM 23, an input device 24, and a result outputting device 26. The CPU 21 attends to overall control. The ROM 22 stores control programs and the like used by the CPU 21. The RAM 23 is used as a work area used by the CPU 21. The input device 24 is used for inputting speech. The result outputting device (e.g., display or printer) 26 outputs speech-recognition results.

The CPU 21 provides functions of the feature-extraction unit 2, the matching unit 4, the dictionary updating unit 6, etc., shown in FIG. 3.

The functions of the feature-extraction unit 2, the matching unit 4, the dictionary updating unit 6, etc., are implemented via software, which is supplied in a software package stored in a memory medium such as a CD-ROM. In FIG. 8, therefore, the speech-recognition device further includes a media driving unit 31, which drives a memory medium 30 when it is set in the driving unit 31.

In other words, the speech-recognition device according to the present invention may be implemented such that a general-purpose computer system has programs loaded thereto from a memory medium such as a CD-ROM, and allows a micro-processor thereof to execute a speech-recognition process. In this configuration, programs for performing a speech-recognition process of the present invention (i.e.; programs used by the hardware system) are supplied by way of a memory medium. The memory medium for storing the programs is not limited to a CD-ROM, but includes a ROM, a RAM, a flexible disc, a memory card, etc. The programs stored in the memory medium are installed in a memory device built in as part of the hardware system. An example of such a memory device is a hard drive. The programs are executed so as to provide functions of the speech-recognition process.

The programs for providing the speech-recognition process of the present invention may be supplied via a communication channel from a server, for example, in stead of being supplied in the form of memory medium.

Further, the present invention is not limited to these embodiments, but various variations and modifications may be made without departing from the scope of the present invention.

What is claimed is:

1. A device for speech recognition, comprising:
a codebook which stores features of recognition objects and time lengths of phonemics, wherein the time lengths are an average time length defined for each phonemic;
a matching unit which compares features of input speech with the features of the recognition objects; and
a codebook updating unit which updates the time lengths of phonemics in said codebook based on the input speech when said matching unit finds substantial similarities between the input speech and one of the recognition objects.

2. The device as claimed in claim 1, further comprising a feature-extraction unit which extracts the features of input speech from the input speech without detecting speech frames, and
wherein said matching unit compares the features of input speech with the features of the recognition objects so as to produce a similarity measure continuously without breaks of speech frames, and said dictionary updating unit updates the time lengths of phonemics when the similarity measure exceeds a predetermined threshold.

3. The device as claimed in claim 1, wherein said dictionary updating unit compares a sum of the time lengths of phonemics constituting said one of the recognition objects with an actual time length of the input speech corresponding to said one of the recognition objects, and updates the time lengths of the phonemics in said dictionary based on a difference between the sum and the actual time length.

4. The device as claimed in claim 1, wherein said dictionary updating unit obtains a difference between a time length of a phonemic in said dictionary and a time length of the same phonemic in the input speech, and adds the difference to the time length of the phonemic in said dictionary so as to update the time lengths of phonemics in said dictionary.

5. The device as claimed in claim 1, wherein said dictionary updating unit obtains a difference between a time length of a phonemic in said dictionary and a time length of the same phonemic in the input speech, and adds the difference multiplied by a given weighting factor to the time length of the phonemic in said dictionary so as to update the time lengths of phonemics in said dictionary.

6. The device as claimed in claim 5, wherein said weighting factor varies depending on how great the substantial similarities are.

7. The device as claimed in claim 5, wherein said weighting factor varies depending on how many times the matching unit correctly finds the substantial similarities with respect to said one of the recognition objects.

8. The device as claimed in claim 1, wherein said dictionary updating unit updates a time length of a given phonemic in said dictionary not only with respect to said one of the recognition objects but also with respect to all the recognition objects that include the given phonemic.

9. A device for speech recognition, comprising:
codebook means for storing features of recognition objects and time lengths of phonemics, wherein the time lengths are an average time length defined for each phonemic;
matching means for comparing features of input speech with the features of recognition objects; and
codebook updating means for updating the time lengths of phonemics in said codebook means based on the input speech when said matching means finds substantial similarities between the input speech and one of the recognition objects.

10. A method of conducting speech recognition, comprising the steps of:
a) storing features of recognition objects and time lengths of phonemics in a codebook, wherein the time length are an average time length defined for each phonemic;
b) comparing features of input speech with the features of the recognition objects; and
c) updating the time lengths of phonemics in said codebook based on the input speech when said step b) finds substantial similarities between the input speech and one of the recognition objects.

11. The method as claimed in claim 10, further comprising a step of
extracting the features of input speech from the input speech without detecting speech frames, and
wherein said step b) compares the features of input speech with the features of the recognition objects so as to produce a similarity measure continuously without breaks of speech frames, and said step c) updates the time lengths of phonemics when the similarity measure exceeds a predetermined threshold.

12. The method as claimed in claim 10, wherein said step c) compares a sum of the time lengths of phonemics constituting said one of the recognition objects with an actual time length of the input speech corresponding to said one of the recognition objects, and updates the time lengths of the phonemics in said dictionary based on a difference between the sum and the actual time length.

13. A machine-readable memory medium having a program embodied therein for causing a computer to perform a speech recognition, said program comprising:
a codebook configured to store features of recognition objects and time lengths of phonemics, wherein the time lengths are an average time length defined for each phonemic;
a matching unit configured to compare features of input speech with the features of the recognition objects; and
a codebook updating unit configured to update the time lengths of phonemics in said codebook based on the input speech when said matching unit finds substantial similarities between the input speech and one of the recognition objects.

14. The machine-readable memory medium as claimed in claim 13, wherein said program further comprises
a feature-extraction unit configured to extract the features of input speech from the input speech without detecting speech frames, and
wherein said matching unit compares the features of input speech with the features of the recognition objects so as to produce a similarity measure continuously without breaks of speech frames, and said dictionary updating unit updates the time lengths of phonemics when the similarity measure exceeds a predetermined threshold.

15. The machine-readable memory medium as claimed in claim 13, wherein said dictionary updating unit compares a sum of the time lengths of phonemics constituting said one of the recognition objects with an actual time length of the input speech corresponding to said one of the recognition objects, and updates the time lengths of the phonemics in said dictionary based on a difference between the sum and the actual time length.

* * * * *